United States Patent [19]

Masser

[11] 4,193,612
[45] Mar. 18, 1980

[54] ELASTOMERIC SUSPENSION SYSTEM FOR WHEELED VEHICLES

[75] Inventor: Lloyd D. Masser, Muskegon, Mich.

[73] Assignee: Lear Siegler, Inc., Santa Monica, Calif.

[21] Appl. No.: 916,942

[22] Filed: Jun. 19, 1978

[51] Int. Cl.² ............................................. B60G 11/60
[52] U.S. Cl. .................................. 280/681; 267/63 A
[58] Field of Search ............... 280/676, 677, 678, 679, 280/680, 681; 267/63 R, 63 A

[56] References Cited

U.S. PATENT DOCUMENTS

| | | | |
|---|---|---|---|
| 2,275,035 | 3/1942 | Pardon | 280/11.28 |
| 2,279,441 | 1/1956 | Henss | 267/21 |
| 3,481,623 | 12/1969 | Campbell | 280/716 |
| 3,512,799 | 5/1970 | Hickman | 280/681 |
| 3,580,593 | 5/1971 | Sprunger | 280/716 |
| 3,689,102 | 2/1972 | Granning | 280/112 R |
| 3,779,576 | 12/1973 | Malcolm | 267/63 A |
| 3,792,871 | 2/1974 | Chalmers | 280/681 |
| 3,817,551 | 6/1974 | Moore | 280/681 |
| 3,892,398 | 7/1975 | Marsh | 267/153 |
| 4,082,316 | 4/1978 | Raidel | 280/681 |

*Primary Examiner*—Philip Goodman
*Attorney, Agent, or Firm*—John E. McGarry

[57] ABSTRACT

An elastomeric suspension system for wheeled vehicles includes an equalizing beam pivotably mounted about its center to a trunnion tube which is rigidly mounted to the frame of the vehicle. The trunnion tube is press fitted into an aperture in a trunnion rubber bushing which, in turn, is press fitted into an aperture in the equalizing beam. Near each end of the equalizing beam is an axle mounted transversely to the beam. Each axle has mounted thereon one end of a cylindrical elastomeric spring which is connected at its other end to the equalizing beam. A rebound shaft is slidably connected at one end to each axle and at the other end to each end of the equalizing beam to prevent excessive rebound of the equalizing beam with respect to the axles. Each axle is pivotally connected to a central portion of the equalizing beam through radius rods. The elastomeric rubber spring isolates a substantial amount of vibrations of the axle, particularly vertical vibration, from the equalizing beam. Each radius rod acts as a guide for the vertical movement of a respective axle. The trunnion rubber bushing further isolates any vibration of the equalizing beam from the trunnion tube.

12 Claims, 8 Drawing Figures

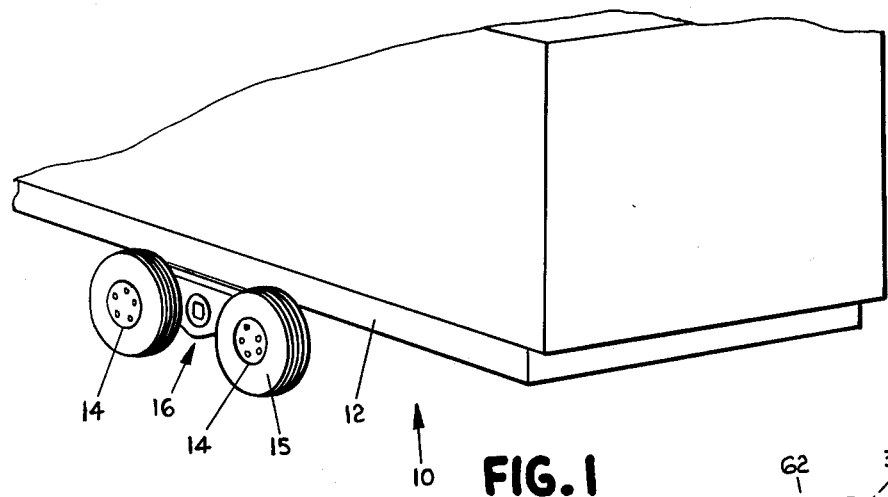
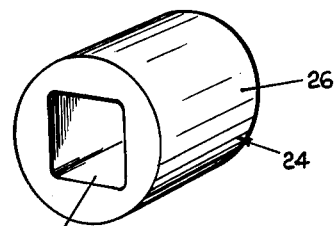
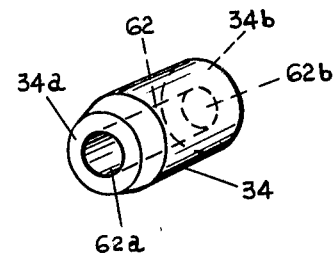
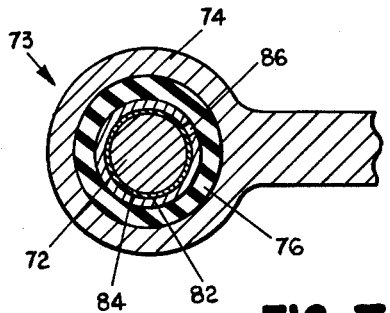
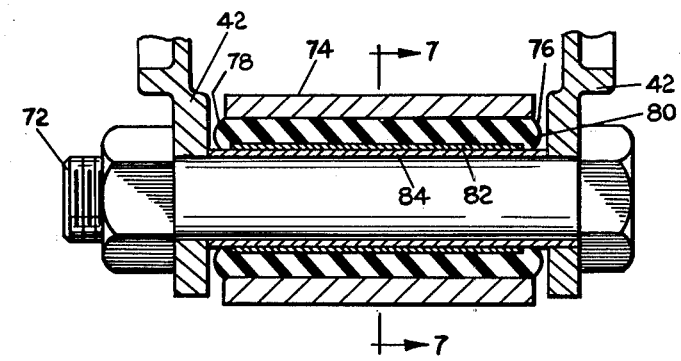
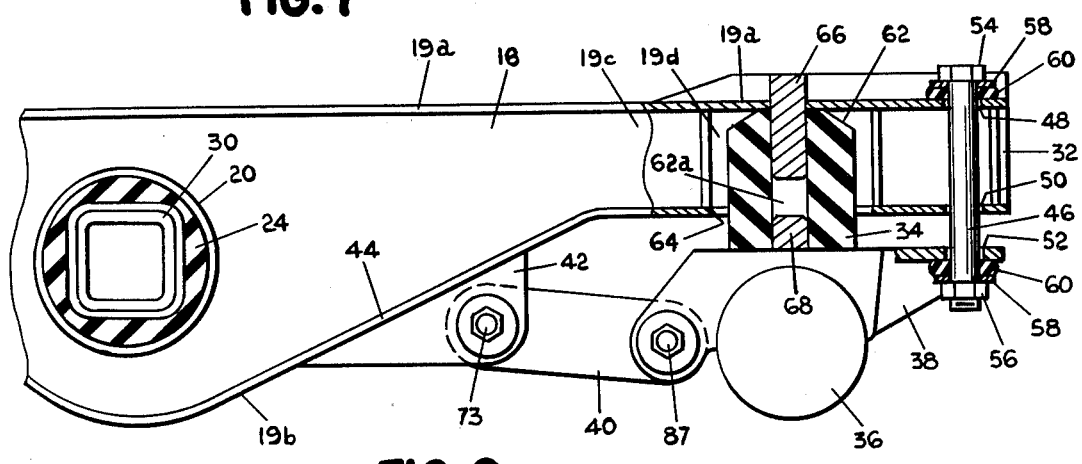

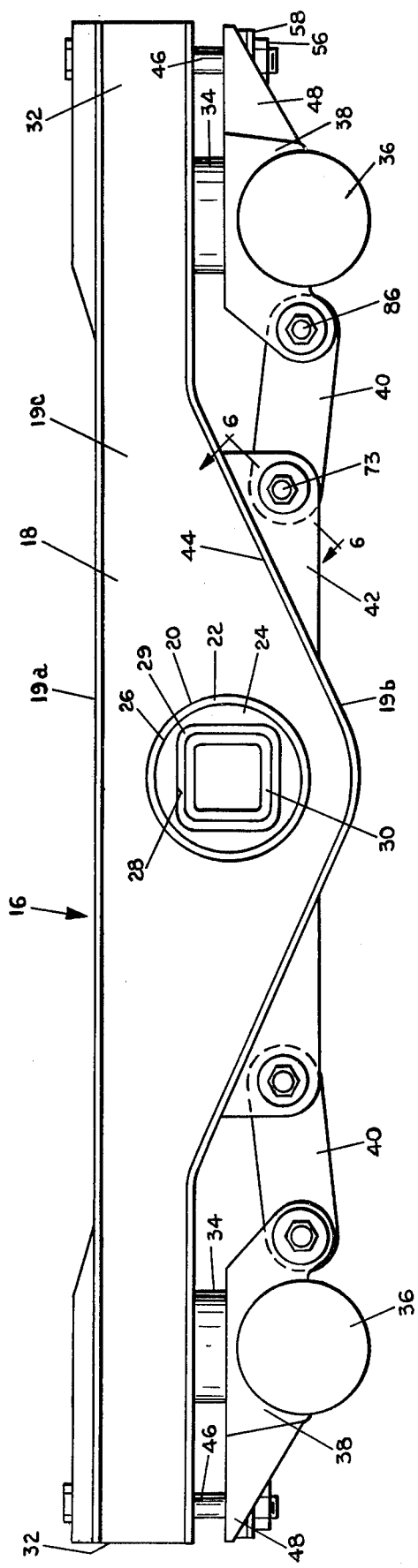
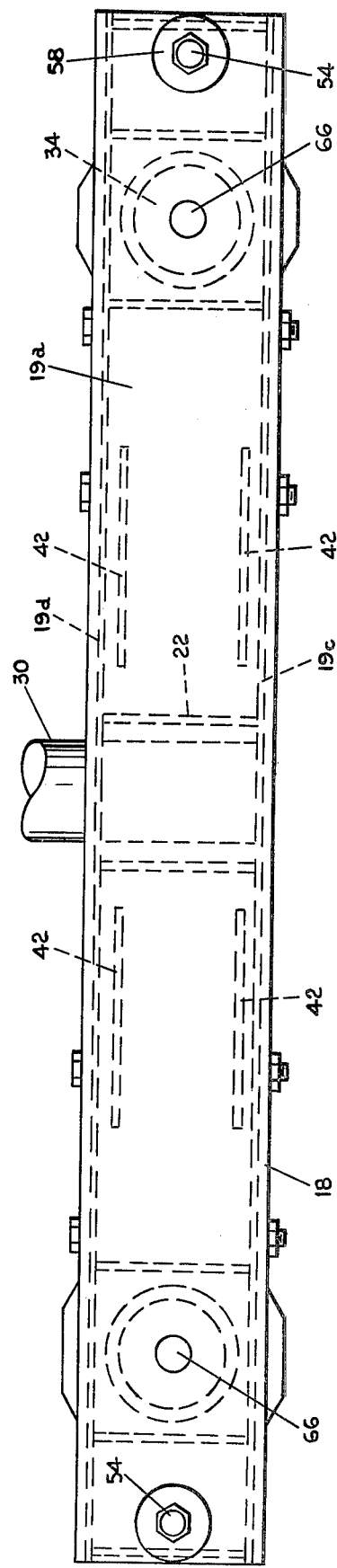

ELASTOMERIC SUSPENSION SYSTEM FOR WHEELED VEHICLES

BACKGROUND OF THE INVENTION

1. Field of the Invention

This invention relates to vehicle suspension systems and more particularly to a vehicle suspension system for tandem axles using elastomeric springs.

2. Description of the Prior Art

Suspension systems for wheeled vehicles such as trucks and trailers have utilized steel leaf springs or expandable air springs. Tandem suspension systems have conventionally used an elongated beam, pivotably mounted at a central portion to the vehicle body and mounted to an axle at each end thereof. Leaf springs have been used in lieu of and in addition to the elongated beam to cushion the ride. The leaf springs are subject to failure over time and have limited lateral stability. In case of failure, the entire suspension must be removed for replacement of the spring. Therefore, spring replacement is a major repair for a suspension system and can not be accomplished as a practical matter in the field.

Recently, solid rubber or "elastomeric" springs have offered a compromise between the economical leaf springs and the more expensive air springs. The solid rubber suspension systems provide a more stable ride than a leaf spring and also require less space under the body of the vehicle than the leaf spring and air spring assemblies.

However, the solid rubber springs have always been positioned between the axle and chassis of the vehicle so that any vibrations which pass through the rubber spring would be felt in the body of the vehicle. In addition, each axle has to be individually aligned to make sure that the axle is precisely perpendicular to the longitudinal axis of the vehicle. One such suspension is disclosed in U.S. Pat. No. 3,481,623 to Campbell issued on Dec. 2, 1969.

An example of a tandem axle suspension system wherein a walking beam is joined to the frame through shear rubber bodies is disclosed in U.S. Pat. No. 3,817,551 issued to Moore on June 18, 1974. In the Moore system, the axles are joined to the walking beam through rubber bushings. The walking beam is centrally mounted to the chassis through a series of rubber bodies which are in shear stress.

SUMMARY OF THE INVENTION

According to the invention, a suspension system for wheeled vehicles, for example trailers, comprises an elongated equalizer beam rockably mounted at a central portion thereof to a load-supporting member of the vehicle. An axle is movably mounted at each end of the equalizer beam for vertical translational movement with respect to the equalizer beam and a cylindrical elastomeric spring means is mounted between each axle and the equalizer beam to absorb jounce deflections of the axle with respect to the equalizer beam.

The elongated equalizer beam is mounted to the load-supporting member of the vehicle through a trunnion beam and a bushed elastomeric torsion spring between the elongated beam and the trunnion beam. Preferably, the trunnion beam is rectangular, for example, square, in cross-section and the elongated beam has a circular opening therethrough in which the bushed elastomeric torsion spring is secured.

A stop means is connected between the equalizer beam and the axle to limit the vertical movement or rebound of the axle away from the equalizer beam. Further, the axle is mounted to the beam through a radius rod having bushed connections to permit vertical translation of the axle with respect to the equalizer beam.

The elastomeric spring is cylindrical and has a vertical bore extending therethrough. A pin extends into the bore from each end thereof, one of the pins being mounted to the axle and the other pin being mounted to the equalizer beam to limit the amount of deflection of the elastomeric spring.

The elastomeric spring is of the type which is solid with the exception of a circular bore therethrough and expands under deflection. This type of rubber spring is to be distinguished from hollow air springs which are filled with air and expand under deflection.

BRIEF DESCRIPTION OF THE DRAWINGS

FIG. 1 is a fragmentary perspective view of a trailer incorporating an embodiment of the invention;

FIG. 2 is a side elevational view of the vehicle suspension system shown in FIG. 1;

FIG. 3 is a top plan view of the vehicle system shown in FIG. 2;

FIG. 4 is a perspective view of the primary elastomeric spring shown in FIG. 2;

FIG. 5 is a perspective view of the elastomeric torsion spring trunnion bushing shown in FIG. 2;

FIG. 6 is a cross-sectional view taken along line 6—6 of FIG. 2 showing the radius rod mounted to the walking beam;

FIG. 7 is a cross-sectional view taken along the line 7—7 of FIG. 6;

FIG. 8 is a fragmentary, partially segmented side elevational view of the embodiment shown in FIG. 2.

DETAILED DESCRIPTION OF THE PREFERRED EMBODIMENT

Referring now to FIG. 1, a trailer 10 has a frame 12 connected to wheels 14 by means of suspension system 16. The wheels 14 are in tandem. Each side of the trailer has an identical syspension system. For the sake of brevity, only one suspension system will be described.

The suspension system 16 is more clearly shown in FIGS. 2 and 3 to which reference is now made. It includes an elongated equalizing beam 18 having a central aperture 20. A round tube 22 of a length equal to the width of the beam 18 is affixed to the edges of the aperture 20. Press fitted within the hollow round tube 22 is a trunnion rubber bushing 24 which, as shown in FIG. 5, has a cylindrical exterior 26 and a square aperture 28 extending centrally therethrough. A square tube 29 is press fitted within the aperture 28. The trunnion rubber bushing 24, the hollow round tube 22 and the square tube 29 form a unit which can be inserted into, or removed from, the equalizer beam. This trunnion bushing assembly has a length approximately equal to the width of the equalizer beam 16. A rectangular trunnion tube 30 extends through the square tubing 29 and is secured thereto. The trunnion tube 30 extends across the trailer and is rigidly mounted to the chassis 12 of the trailer. The rectangular cross-section trunnion tube is stronger than a round tube of approximately equal size and is easier to attach to the vehicle frame.

The equalizing beam 18 has an upper plate 19a, a bottom plate 19b, and side plates 19c and 19d welded together. The beam 18 extends in opposite directions from a central aperture 20 and tapers off toward its two ends 32. Rubber springs 34 are mounted to the narrower portions of the ends 32 and extend downwardly therefrom. Axles 36 are welded to axle brackets 38 which are connected to the bottom end of the rubber springs 34. Each axle bracket 38 is also pivotably mounted to radius rod 40 through a bushed shaft assembly 86. The radius rod extends horizontally towards the center of the equalizing beam 18 and is pivotally connected through a bushed shaft assembly 73 to flanges 42 extending from the tapered portion of the equalizing beam 18.

At each outer end 32 of the equalizing beam is a rebound bolt 46 slidably connected through the outer end 32 and the outer end 48 of the bracket 38. As more clearly shown in FIG. 8, the bolt 46 passes through apertures 48 and 50 of outer end 32 and apertures 52 in bracket 38. The bolt has a head 54 at one end thereof and a nut 56 threaded onto the other end. Washers 58 are provided on the bolt 46 adjacent the nut 56 and head 54. A pair of annular rubber snubbers 60 are provided between the washers 58 and the bracket 38 and equalizing beam 18. The bolt 46 thus limits the vertical travel of the axle with respect to the equalizing beam.

The rubber spring 34 as shown in FIG. 8 and FIG. 4 is cylindrically shaped with a tapered upper end 62. A cylindrical aperture 62a extends vertically through the spring 34 and receives a positioning lug 66 at the upper end and a positioning lug 68 at the bottom end. The cylindrical spring 34 is sized to fit into an aperture 64 in the bottom plate 19c of the equalizing beam 18. Lug 68 is rigidly mounted to the top plate 19a of the equalizing beam 18. Lug 68 is mounted to the bracket 38. The lugs 64 and 68 are spaced from each other during normal loading but come into contact under heavy loading or large jounces to limit the deflection of the rubber springs.

Reference will now be made to FIGS. 6 and 7 in describing the pivotal connection of the radius rod 40 to the equalizing beam 18 and axle 36. Both the connections are identical and for the sake of brevity, only one such connection will be described. As shown in FIG. 6, the equalizing beam 18 has a pair of flanges 42 with holes for receiving a bolt 72. The bolt 72 extends between the depending flange 42 of the equalizing beam 18 and through a sleeve 74 for pivotally mounting the radius rod 40 on the beam member 18. A yieldable and compressible annular bushing 76 having inwardly turned ends 78 and 80 is compressed and press fitted within the sleeves 74. A split lubricating liner 82 is provided within the bushing 76 between the down turned ends 78 and 80. A sleeve 84 is press fitted into the bushing 76 and in contact with the liner 82. The split lubricating liner is cylindrically shaped and has an inner diameter and inner circumference slightly less than the outer diameter or circumference of the sleeve 84. This difference results in an open slot running along the entire length of the liner, the slot leaving an elongated space 86 as shown in FIG. 7 defined by the edges of the liner, the bushing 100 and the cylindrical metal sleeve 106. As illustrated in FIG. 6, the depending flanges 42 are clamped by the bolt tightly against the sleeve 84 so that the sleeve 84 remains fixed with respect to the bolt 98. The radius rod is rigidly mounted to the outer sleeve 74 so that the radius rod is freely rotatable about bolt 72.

The compressible bushing 76 isolates the suspension from vibration.

In operation, the axle 36 is conventionally mounted to wheels 14 which have tires 15 mounted thereon. As the tires hit a bump, the tire transmits the jounce to the wheels 14 which in turn transmit the jounce to the axle 13. The jounce is turned into upper translational movement of the axles 36 with respect to the equalizer beam 18. The axles 36 will transmit jounce to axle brackets 38. The rubber springs 34 are compressed to absorb the jounce so that most of the shock is isolated from the equalizer beam 18. The radius rods 40 pivot upward and downward to guide the axles. Further, the radius rods 40 resist and absorb horizontal and side forces on the axles. The rubber bushings 76 isolate the equalizer beam 18 from vibrations of the axles transmitted through the radius rod 40. When the rubber spring 34 absorbs a shock and the axle 38 rebounds downwardly, the rubber snubbers 60 on bolt 46 prevent the axle housing 38 from rebounding too far and pulling lugs 66 and 68 from the apertures of the rubber spring 34.

When a wheel on the forwardmost axle hits a bump, the reaction from the equalizer beam 18 will tend to rotate the beam 18 in a clockwise direction. This tendency will be resisted by the torsional resistance of the trunnion rubber bushing 24. The opposite reaction will take place when the wheel on the rearmost axle hits a bump. Thus, the trunnion bushing 24 tends to damp oscillations about the trunnion tube 30.

The rubber springs 34 used in this invention are solid rubber and are suitable for this tandem axle to deform axially when compressed. One rubber spring which is suitable is the MARSH MELLOW TM reinforced rubber springs manufactured by Firestone Tire and Rubber Company and disclosed in U.S. Pat. No. 3,892,398, issued July 1, 1975.

The suspension system according to the invention provides a double vibration isolation between the wheels and the chassis of a trailer. The suspension provides the durability of equalizer beam suspension while giving a ride approaching that of a leaf spring tandem suspension. Further, replacement of a worn rubber spring is easily accomplished by simply removing the worn spring and replacing it with a new spring. To this end, the nut 56 on bolt 46 is simply removed to allow the axle to drop so that the old spring can be removed and replaced with a new spring. Such replacement can take place in the field and the cost of shop repairs is thus avoided. Further, the springs can be easily changed for different road conditions in the manner described above.

Reasonable variations and modifications are possible within the scope of the foregoing disclosure and drawings without departing from the spirit of the invention which is defined in the accompanying claims.

The embodiments of the invention in which an exclusive property or privilege is claimed are defined as follows:

1. A suspension system for a wheeled vehicle comprising:
   an elongated equalizer beam rockably mounted at a central portion thereof to a load-supporting member of the vehicle;
   a pair of axles pivotably mounted to the equalizer beam through a rigid radius rod for vertical translational movement with respect to each end thereof; and a cylindrical elastomeric spring means mounted between each axle and the equalizer beam and vertically above each axle to absorb jounce deflections of the axle with respect to the equalizer beam.

2. A suspension system according to claim 1 wherein the equalizer beam is mounted to the load-supporting member of the vehicle through a trunnion beam and further comprising a bushed elastomeric torsion spring joining the equalizer beam to the trunnion beam.

3. A suspension system according to claim 2 wherein the trunnion beam is rectangular in cross-section.

4. A suspension system according to claim 3 wherein the equalizer beam has a circular opening therethrough in which the bushed elastomeric torsion spring is secured.

5. A suspension system according to claim 4 wherein the cylindrical elastomeric spring means further comprises means to limit the vertical movement of each axle toward the equalizer.

6. A suspension system according to claim 1 wherein the cylindrical elastomeric spring means further comprises means to limit the vertical movement of each axle toward the equalizer beam.

7. A suspension system according to claim 6 wherein the vertical movement limiting means comprises a bore extending vertically through the spring means; stop means mounted to the axle and extending upwardly in the bore a portion of the distance to the spring means; and stop means mounted to the equalizer beam and extending downwardly into the bore a portion of the distance through the spring means.

8. A suspension system according to claim 7 and further comprising means to limit the travel of each axle away from the equalizer beam.

9. A suspension system according to claim 8 wherein the travel-limiting means comprises an elongated stop member slidably connected at one end to the axle and slidably connected at the other end to the equalizer beam.

10. A suspension system according to claim 9 and further comprising bushed elastomeric connections between the radius rod and the equalizer beam and between the radius rod and the axle.

11. A suspension system according to claim 6 and further comprising means to limit the travel of each axle away from the equalizer beam.

12. A suspension system according to claim 1 and further comprising means to limit the travel of each axle away from the equalizer beam.

* * * * *